US007964853B2

(12) United States Patent
Araya

(10) Patent No.: US 7,964,853 B2
(45) Date of Patent: Jun. 21, 2011

(54) LASER SCANNING MICROSCOPE

(75) Inventor: Akinori Araya, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/772,361

(22) Filed: May 3, 2010

(65) Prior Publication Data

US 2010/0282981 A1 Nov. 11, 2010

(30) Foreign Application Priority Data

May 8, 2009 (JP) .................................. 2009-113719

(51) Int. Cl.
*G01N 21/64* (2006.01)
(52) U.S. Cl. .................................................... 250/458.1
(58) Field of Classification Search ................ 250/458.1
See application file for complete search history.

(56) References Cited

U.S. PATENT DOCUMENTS 5,065,008 A 11/1991 Hakamata et al.
7,339,148 B2 3/2008 Kawano et al.
2005/0018958 A1* 1/2005 Huang et al. ..................... 385/18
2008/0156999 A1 7/2008 Nishiwaki et al.
2010/0194414 A1* 8/2010 Jun et al. ....................... 324/753

FOREIGN PATENT DOCUMENTS

EP 1 431 795 A1 6/2004
JP 2004-199063 A 7/2004

\* cited by examiner

*Primary Examiner* — David P Porta
*Assistant Examiner* — Kiho Kim
(74) *Attorney, Agent, or Firm* — Holtz, Holtz, Goodman & Chick, PC

(57) ABSTRACT

A laser scanning microscope that can construct a fluorescence image with high resolution even with a photodetector having a small array size is provided. A laser scanning microscope includes a line-focusing optical system that focuses laser light from a laser light source in the form of a line; a DMD having a plurality of movable micromirrors that are arrayed in the same direction of the line and reflect the focused laser light; a galvanometer mirror that scans the laser light reflected by the DMD; an irradiation optical system that irradiates a sample with the scanned laser light; a photodetector having a plurality of channels that detect light from the sample and are arrayed in a single line; and a controller that controls the DMD so as to cause the light reflected by the different movable micromirrors to enter the respective channels, and that sequentially switches between the micromirrors that reflect the light that is to enter the channels so that the light from different positions on the sample enters the channels.

4 Claims, 11 Drawing Sheets

FIG. 5

| | 1-1 | 1-2 | 1-3 | 1-4 | 2-1 | 2-2 | 2-3 | 2-4 | |
|---|---|---|---|---|---|---|---|---|---|
| | 1-1 | 1-2 | 1-3 | 1-4 | 2-1 | 2-2 | 2-3 | 2-4 | |
| | 1-1 | 1-2 | 1-3 | 1-4 | 2-1 | 2-2 | 2-3 | 2-4 | |
| Scan | 1-1 | 1-2 | 1-3 | 1-4 | 2-1 | 2-2 | 2-3 | 2-4 | |
| | 1-1 | 1-2 | 1-3 | 1-4 | 2-1 | 2-2 | 2-3 | 2-4 | |
| | 1-1 | 1-2 | 1-3 | 1-4 | 2-1 | 2-2 | 2-3 | 2-4 | |
| | 1-1 | 1-2 | 1-3 | 1-4 | 2-1 | 2-2 | 2-3 | 2-4 | |
| | 1-1 | 1-2 | 1-3 | 1-4 | 2-1 | 2-2 | 2-3 | 2-4 | |

SPOTS ON DMD

SPOTS ON PHOTODETECTOR

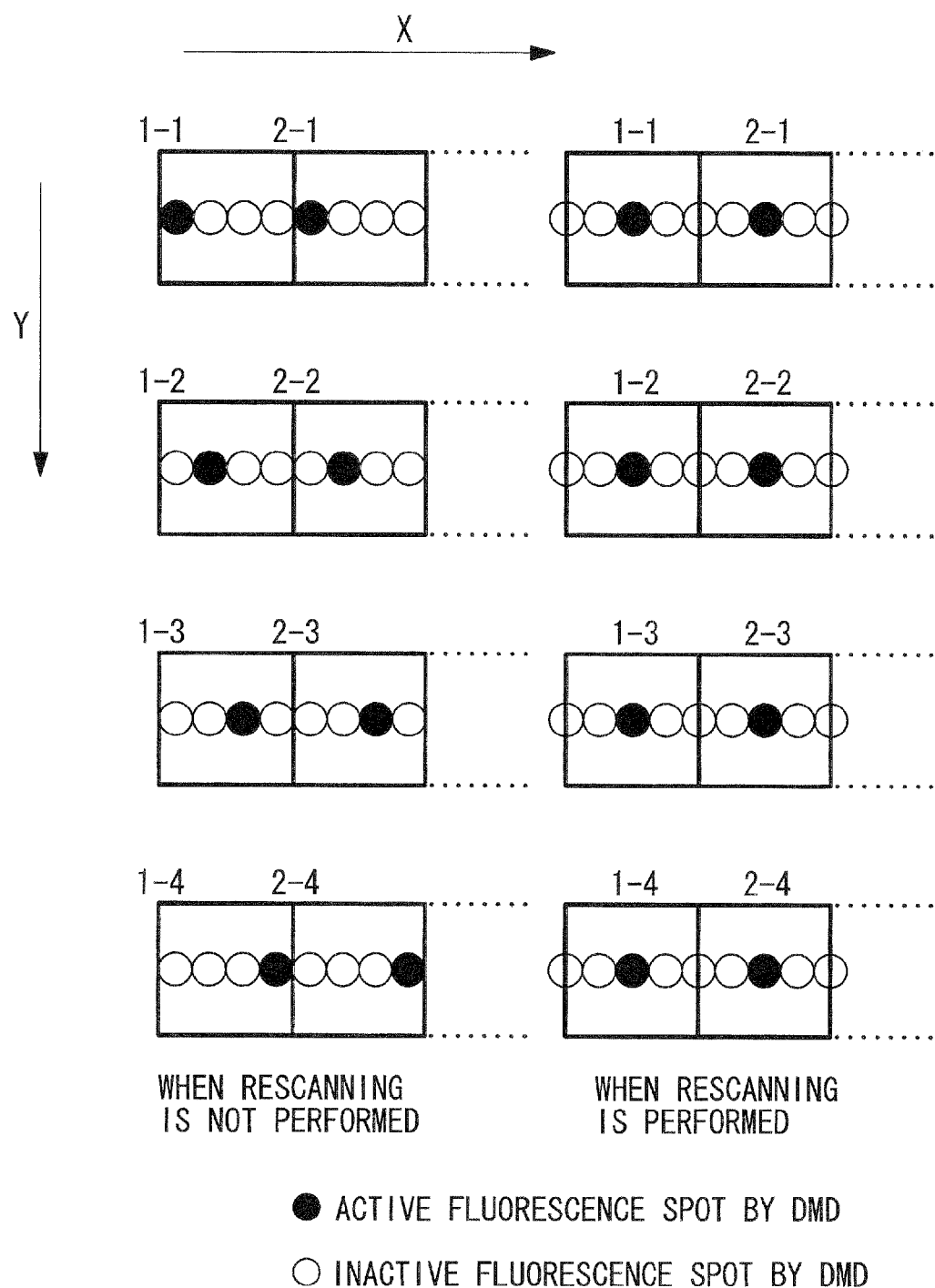

LASER SCANNING MICROSCOPE

BACKGROUND OF THE INVENTION

1. Field of the Invention

The present invention relates to laser scanning microscopes.

This application is based on Japanese Patent Application No. 2009-113719, the content of which is incorporated herein by reference.

2. Description of Related Art

In the related art, a known laser scanning microscope includes a light source that irradiates a sample with laser light and a photodetector that detects fluorescence from the sample, and has a digital micromirror device (referred to as "DMD" hereinafter), equipped with multiple micromirrors, and a galvanometer mirror that are disposed between the light source and the photodetector (for example, see Japanese Unexamined Patent Application, Publication No. 2004-199063).

The laser scanning microscope is configured to form an image of linear laser light on the DMD and to scan the linear laser light reflected by the DMD in a direction orthogonal to the line by using the galvanometer mirror. Thus, by performing on/off control on the micromirrors of the DMD on which the image of the laser light is formed, single-dot operation, multiple-dot operation, or linear scanning operation can be selected.

The aforementioned laser scanning microscope is configured such that the irradiated positions (resolution) of the sample and the pixels of the photodetector have a one-to-one relationship. Therefore, if the desired resolution is, for example, 512 by 512 pixels, the array size of the photodetector needs to be 512 pixels or more.

BRIEF SUMMARY OF THE INVENTION

The present invention provides a laser scanning microscope that can construct a fluorescence image with high resolution even with a photodetector having a small array size.

In general, an arrayed-type photodetector with high detection sensitivity has a small array size, and, in practice, only about 32 pixels. Therefore, with the configuration of the related art, images of the required resolution cannot be acquired when using a photodetector with high sensitivity, whereas, in the present invention, a high-resolution image can be constructed using an arrayed-type detector with high sensitivity.

The present invention provides a laser scanning microscope that includes a laser light source that emits laser light; a line-focusing optical system that focuses the laser light from the laser light source in the form of a line; a micro-element array including a plurality of micro-elements that are arrayed in the same direction of the line and reflect or transmit the laser light focused by the line-focusing optical system; a scanner that scans the laser light reflected or transmitted by the micro-element array in a orthogonal direction of the line; an irradiation optical system that irradiates a sample with the laser light scanned by the scanner; a photodetector disposed at a conjugate position with respect to the micro-element array and having a plurality of channels that detect light from the sample and that are arrayed in a single line at a pitch larger than that of the micro-elements of the micro-element array; and a controller that controls the micro-element array so as to cause the light reflected or transmitted by the different micro-elements to enter the respective channels, and that sequentially switches between the micro-elements that reflect or transmit the light that is to enter the channels so that the light from different positions on the sample enters the channels.

According to the present invention, the laser light emitted from the laser light source is focused by the line-focusing optical system in the form of a line and is reflected or transmitted by the micro-element array before being scanned by the scanner and emitted towards the sample via the irradiation optical system. Consequently, a fluorescent material in the sample is excited so as to generate fluorescence, and the generated fluorescence is detected by the photodetector, thereby acquiring a fluorescence image.

In this case, because the controller controls the micro-element array so as to cause the light reflected or transmitted by the different micro-elements to enter the respective channels of the photodetector, the light from different positions on the sample can be detected in the channels. In addition, by sequentially switching between the micro-elements that reflect or transmit the light that is to enter the respective channels so that the light from different positions on the sample enters the channels, the position on the sample to be detected in each channel can be sequentially changed. By arranging the detection results on the basis of a positional relationship specified by the scanner and the micro-element array, a fluorescence image with high resolution can be acquired by the photodetector, which has low resolution.

In the present invention described above, a second scanner that scans the light from the sample in a direction extending in the same direction of the line on the sample may be further provided.

By using the second scanner to scan the light from the sample in the same direction of the line on the sample, the detection position in each channel can be changed. Consequently, for example, by operating the second scanner so that the light from any position on the sample can be detected substantially in the center of each channel, the light from the sample can be reliably detected.

In the present invention described above, a dispersing element that splits the light from the sample into spectral components, arranges the spectral components in the direction orthogonal direction of the line, and emits the spectral components may be further provided, and moreover, multiple arrays of the photodetectors may be provided in the direction orthogonal direction of the line and may be configured to detect the spectral components split by the dispersing element.

Accordingly, the light from different positions on the sample can be detected in the respective channels, and the light is split so as to allow for detection of each of the spectral components. By arranging the detection results on the basis of a positional relationship specified by the scanner and the micro-element array, a fluorescence image with high resolution can be acquired for each spectral component.

In the present invention described above, when one focal spot is to be generated by the plurality of micro-elements, the depth of focus of at least one of the line-focusing optical system and a detection optical system that focuses light from the micro-element array onto the photodetector may be set greater than an optical-path difference occurring between the micro-elements that generate the one focal spot.

Accordingly, when one focal spot is to be generated by the plurality of micro-elements, the light reflected or transmitted by each micro-element can be prevented from deviating from a focused state, thereby stabilizing the image-formation state and allowing for acquisition of a clear fluorescence image.

The present invention advantageously provides the ability to construct an image with high resolution even with a photodetector having a small array size.

BRIEF DESCRIPTION OF THE SEVERAL VIEWS OF THE DRAWINGS

FIG. 5 is a diagram explaining pixel arrays in a fluorescence image generated by the laser scanning microscope in FIG. 1;

FIG. 11 is a diagram explaining the operation of the laser scanning microscope in FIG. 10.

DETAILED DESCRIPTION OF THE INVENTION

A laser scanning microscope 100 according to an embodiment of the present invention will be described below with reference to the drawings.

Figure 1:
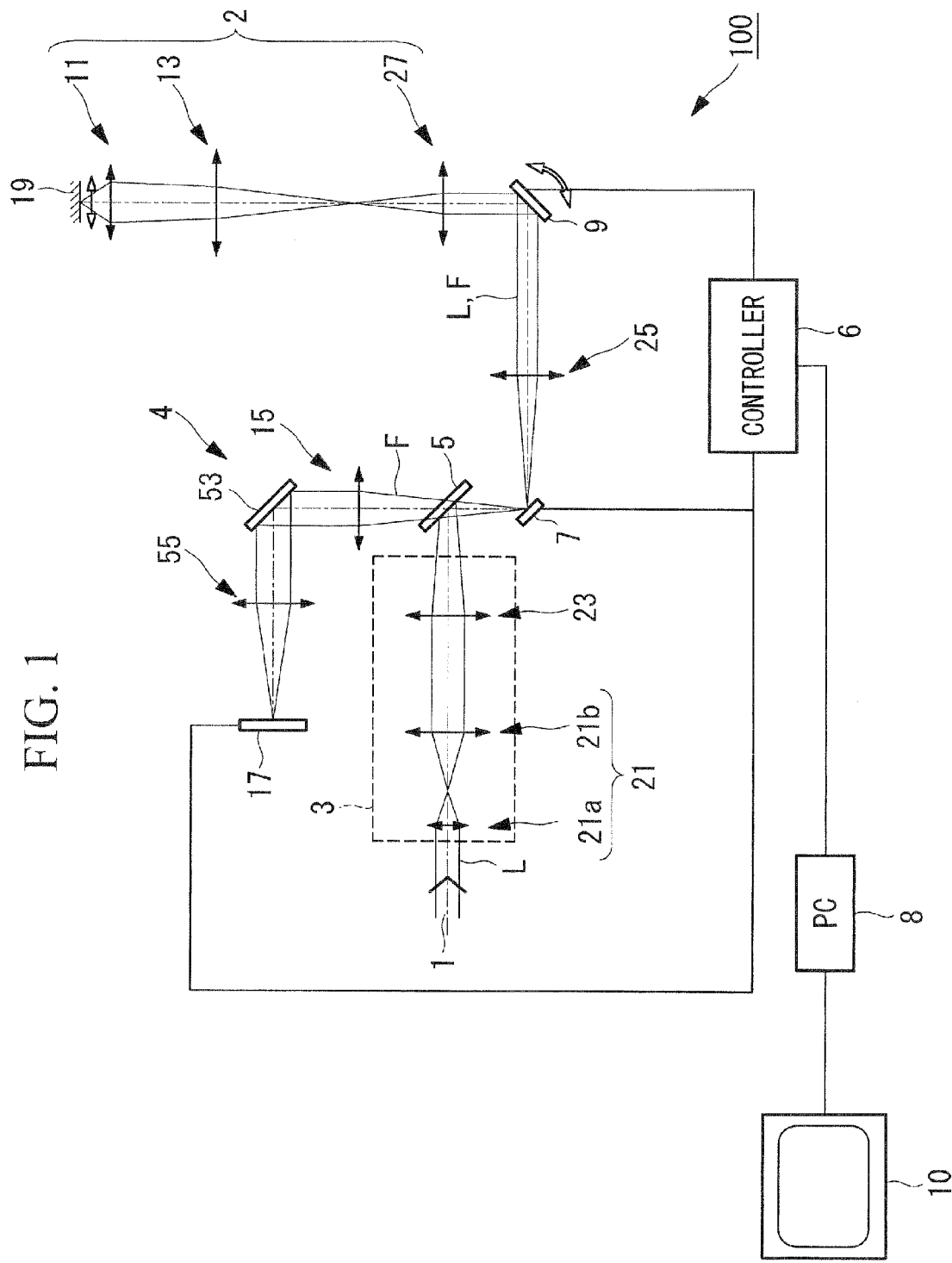
FIG. 1 is a schematic configuration diagram of a laser scanning microscope according to an embodiment of the present invention.

As shown in FIG. 1, the laser scanning microscope 100 according to this embodiment mainly includes a laser light source 1 that emits laser light L, a line-focusing optical system 3 that focuses the laser light L from the laser light source 1 in the form of a line, a DMD (micro-element array) 7 that selectively reflects the laser light L focused by the line-focusing optical system 3, a galvanometer mirror (scanner) 9 that scans the laser light L reflected by the DMD 7, an irradiation optical system 2 that irradiates a sample 19 with the laser light L scanned by the galvanometer mirror 9, an excitation dichroic mirror 5 that deflects fluorescence F generated in the sample 19 from the optical path of the laser light L, a detection optical system 4 that detects the fluorescence F deflected by the excitation dichroic mirror 5, and a controller 6 that controls these components.

The line-focusing optical system 3 includes a beam expander 21 that adjusts the beam diameter of the laser light L by changing the distance between a lens 21a and a lens 21b, and a cylindrical lens 23 that converts the cross section of the laser light L from a substantially circular shape to a linear shape. With such a configuration, the line-focusing optical system 3 is configured to focus the laser light L from the laser light source 1 in the form of a line on the DMD 7.

The excitation dichroic mirror 5 is configured to reflect the laser light L from the line-focusing optical system 3 toward the DMD 7 and transmit the fluorescence F generated in the sample 19. With such properties, the excitation dichroic mirror 5 is configured to cause the fluorescence F generated in the sample 19 and returning thereto via the irradiation optical system 2, the galvanometer mirror 9, and the DMD 7 to be deflected from the optical path of the laser light L.

Figure 2:
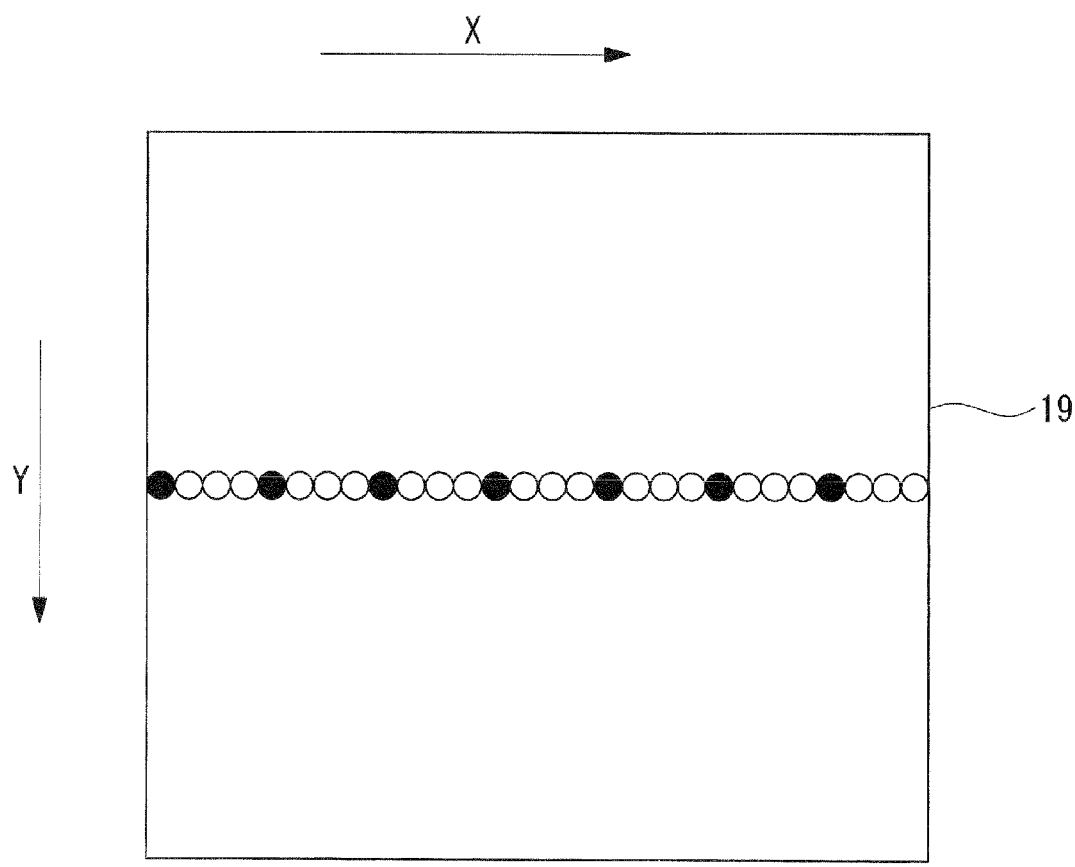
FIG. 2 is a diagram illustrating spot positions of laser light on a sample.

The DMD 7 includes a plurality of movable micromirrors (micro-elements), which are not shown. These movable micromirrors are arrayed in the same direction of the laser light L linearly focused by the line-focusing optical system 3. With such a configuration, the DMD 7 is configured to operate (turn on/off) the movable micromirrors so as to selectively reflect a portion of the laser light L focused by the line-focusing optical system 3 toward the galvanometer mirror 9. Consequently, as shown in FIG. 2, the portion of the laser light L is emitted as a plurality of spot beams (black dots in FIG. 2) that are spaced from each other in the same direction (X direction) of the line on the sample 19.

Furthermore, the DMD 7 is disposed at a conjugate position with respect to the sample 19, and an image of the sample 19 can be formed on the DMD 7.

The galvanometer mirror 9 is, for example, an aluminum-coated movable mirror. By changing the angle of the galvanometer mirror 9, the linear laser light L reflected by the DMD 7 is scanned in a direction (Y direction) orthogonal direction of the line on the sample 19, as shown in FIG. 2.

The DMD 7 and the galvanometer mirror 9 have a relay lens 25 therebetween that relays the laser light L reflected by the DMD 7.

The irradiation optical system 2 includes a pupil projection lens 27, an image forming lens 13, and an objective lens 11. With such a configuration, the irradiation optical system 2 is configured to focus the laser light L scanned by the galvanometer mirror 9 onto the sample 19 and to collect the fluorescence F generated in the sample 19.

The detection optical system 4 includes two relay lenses 15 and 55 that relay the fluorescence F transmitted through the excitation dichroic mirror 5, a mirror 53 that is disposed between the relay lens 15 and the relay lens 55 and reflects the fluorescence F transmitted through the excitation dichroic mirror 5 toward a photodetector 17, and the photodetector 17 that detects the fluorescence F reflected by the mirror 53.

Figure 3:
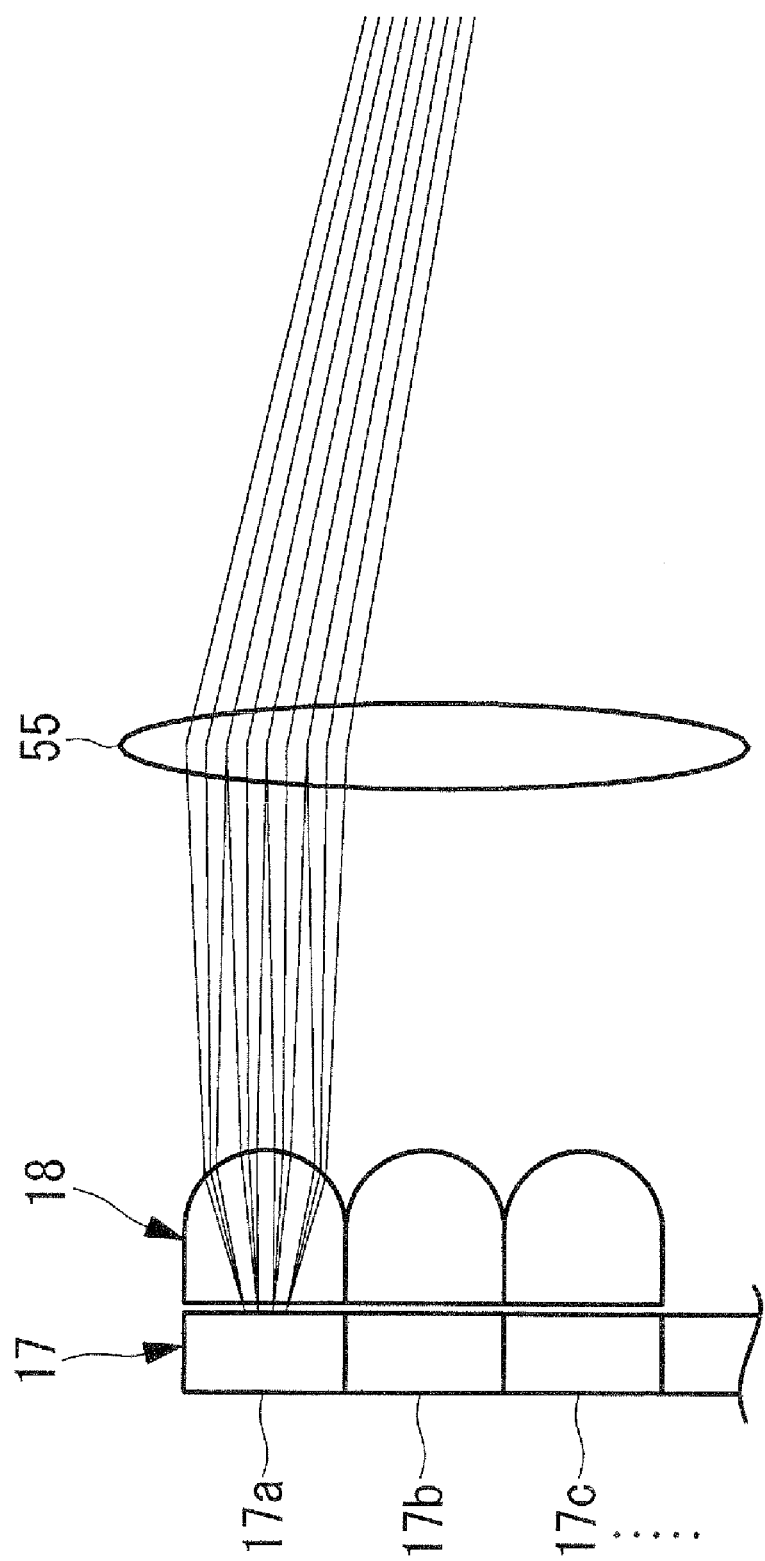
FIG. 3 is a partially enlarged view of a photodetector in FIG. 1.

The photodetector 17 is, for example, a 32-channel photomultiplier tube having a plurality of channels (17a, 17b, 17c, ...) that detect light from the sample 19 and are arrayed in a single line, as shown in FIG. 3. The channels are arrayed at a pitch greater than that of the movable micromirrors of the DMD 7. The photodetector 17 is disposed at a conjugate position with respect to the DMD 7.

A 32-channel photomultiplier tube whose photoelectric surface is formed of GaAs (gallium arsenide) is preferably used as the photodetector 17 since it has higher quantum efficiency.

Furthermore, the photodetector 17 and the relay lens 55 have cylindrical lenses 18 therebetween that focus the fluorescence F on the respective channels of the photodetector 17.

A controller 6 controls the DMD 7, the galvanometer mirror 9, and the photodetector 17 so that they operate in synchronization with each other. In detail, the controller 6 controls the DMD 7 so as to cause light reflected by the different movable micromirrors to enter the respective channels of the photodetector 17. Moreover, the controller 6 controls the DMD 7 and thus operates the movable micromirrors so as to sequentially switch between the movable micromirrors that reflect the light that is to enter the respective channels.

By performing such control, the fluorescence F from different positions on the sample 19 can be detected in the channels of the photodetector 17, and the position on the sample 19 to be detected in each channel can be sequentially changed.

Furthermore, the controller 6 is connected to a personal computer (referred to as "PC" hereinafter) 8 that generates a fluorescence image on the basis of intensity data of the fluorescence F detected by the photodetector 17. The PC 8 is connected to a monitor 10 that displays the fluorescence image generated by the PC 8.

The operation of the laser scanning microscope 100 having the above-described configuration will be described below.

With the laser scanning microscope 100 according to this embodiment, the beam diameter of the laser light L emitted from the laser light source 1 is adjusted by the beam expander 21. The laser light L is then transmitted through the cylindrical lens 23 so as to be focused in the form of a line before being reflected towards the DMD 7 by the excitation dichroic mirror 5.

The laser light L reflected by the excitation dichroic mirror 5 forms an image on the DMD 7 in the form of a line extending in the arrayed direction (X direction) of the movable micromirrors. Of the laser light L whose image is formed on the DMD 7, only the laser light L reflected by the movable micromirrors of the DMD 7 that are in ON mode are reflected towards the galvanometer mirror 9 as spot beams (black dots in FIG. 2).

The laser light L reflected by the DMD 7 is relayed by the relay lens 25 before being scanned by the galvanometer mirror 9 in the direction (Y direction) orthogonal direction of the line. The laser light L scanned in this manner travels through the pupil projection lens 27 and the image forming lens 13 so as to be focused onto a focal position on the sample 19 by the objective lens 11.

At the focal position on the sample 19, a fluorescent material in the sample 19 is excited so as to generate the fluorescence F. The generated fluorescence F is collected by the objective lens 11 and is subsequently made incident on the DMD 7 via the image forming lens 13, the pupil projection lens 27, the galvanometer mirror 9, and the relay lens 25.

The fluorescence F incident on the DMD 7 is reflected towards the excitation dichroic mirror 5 by the movable micromirrors of the DMD 7 and is transmitted through the excitation dichroic mirror 5 so as to be deflected from the optical path of the laser light L. In this case, each movable micromirror with a sufficiently small area functions as a confocal pinhole, and only the fluorescence F from the focused position of the laser light L on the sample 19 is reflected towards the excitation dichroic mirror 5, whereas fluorescence generated from the surrounding area thereof is blocked so as not to enter the detection optical system 4.

The fluorescence F transmitted through the excitation dichroic mirror 5 travels through the relay lenses 15 and 55 and the mirror 53 so as to be detected by the photodetector 17.

Figure 4:
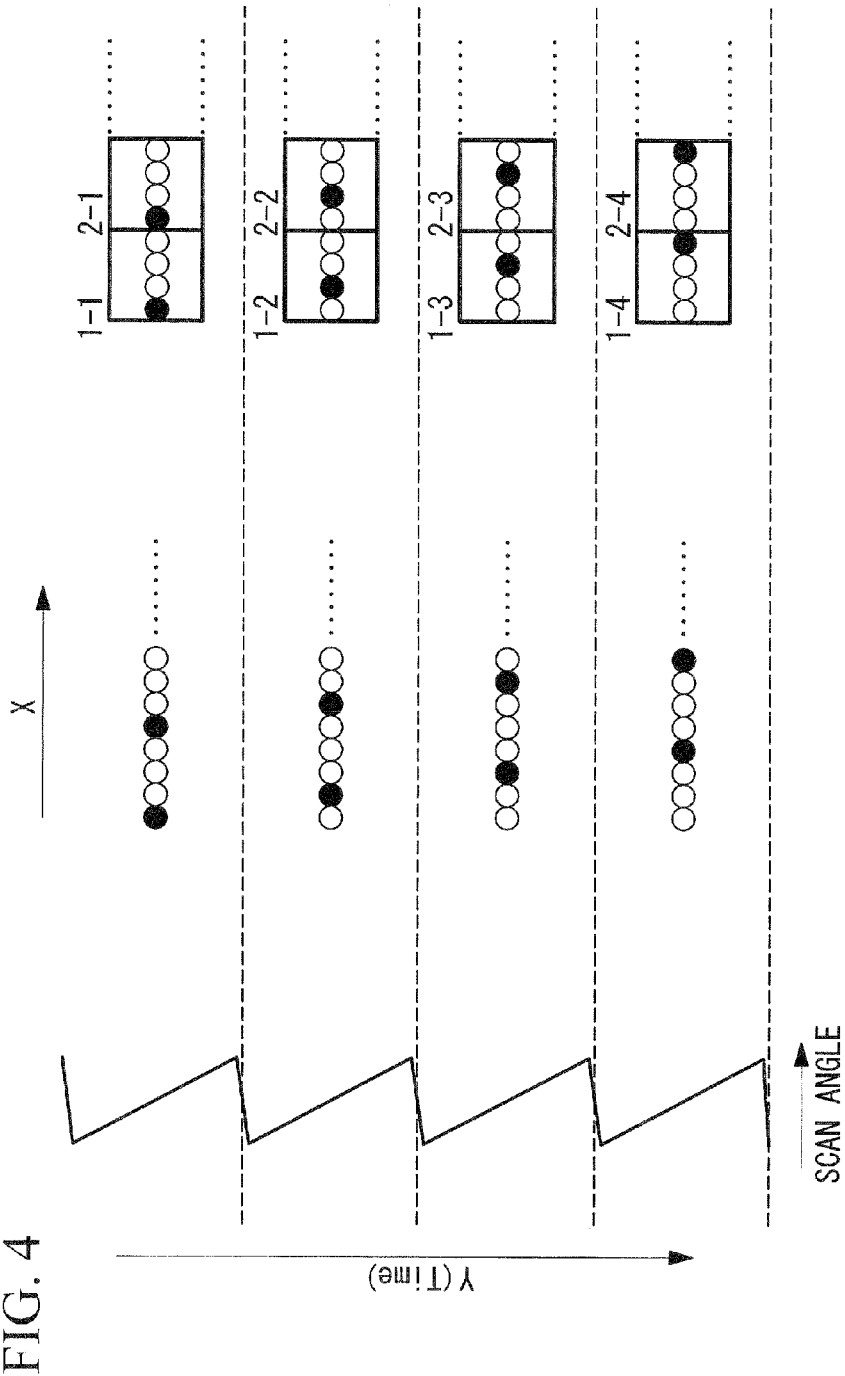
FIG. 4 is a diagram explaining the operation of the laser scanning microscope in FIG. 1.

In this case, as shown in FIG. 4, ON/OFF modes of the movable micromirrors of the DMD 7 are switched on the basis of a command from the controller 6. The following description is directed to a case where four spot beams of the laser light L are incident on each channel of the photodetector 17.

Of the plurality of movable micromirrors arrayed in the DMD 7, movable micromirrors spaced apart from each other by three positions in the same direction (X direction) of the line are switched to the ON mode, whereas the other movable micromirrors are switched to the OFF mode.

Every time a single scanning process is performed in the direction (Y direction) orthogonal direction of the line, movable micromirrors to be set in the ON mode are shifted in the X direction by one position so as to irradiate the entire observation region of the sample 19 with the laser light L without any gaps.

By performing such control, each active spot beam of the fluorescence F (black dot in FIG. 4) can be shifted by one position in the X direction in each channel of the photodetector 17, whereby the position on the sample 19 to be detected in each channel can be sequentially changed in the X direction. Each active spot beam of the fluorescence F does not necessarily have to be shifted by one position to an adjacent spot position, as in the example shown in FIG. 4, but may be shifted, for example, by skipping to the one after the adjacent spot position.

Specifically, in the example shown in FIG. 4, pixels 1-1, 1-2, 1-3, and 1-4 represent a region detected in a channel 17a of the photodetector 17 in each scan cycle, that is, one pixel in a fluorescence image generated from the fluorescence F detected in the channel 17a. In the pixel 1-1, the leftmost fluorescence spot is active. In the pixel 1-2, the second fluorescence spot from the left is active. In the pixel 1-3, the third fluorescence spot from the left is active. In the pixel 1-4, the fourth fluorescence spot from the left (i.e., the rightmost fluorescence spot) is active.

Pixels 2-1, 2-2, 2-3, and 2-4 correspond to a region detected in a channel 17b of the photodetector 17 in each scan cycle, and are configured such that an active spot beam of the fluorescence F is shifted by one position in the X direction, as in the pixels 1-1, 1-2, 1-3, and 1-4.

The intensity data of the fluorescence F detected in this manner is sent to the PC 8 via the controller 6. As shown in FIG. 5, in the PC 8, the intensity data of the fluorescence F detected by the photodetector 17 are arranged on the basis of a positional relationship specified by the galvanometer mirror 9 and the DMD 7 so that a fluorescence image is generated. The fluorescence image generated in this manner is displayed on the monitor 10.

As described above, with the laser scanning microscope 100 according to this embodiment, because the controller 6 controls the DMD 7 so as to cause the fluorescence F reflected by the different movable micromirrors to enter the respective channels of the photodetector 17, the fluorescence F from different positions on the sample 19 can be detected in the channels. Furthermore, by sequentially switching between the movable micromirrors that reflect the fluorescence F that is to enter the respective channels, the position on the sample 19 to be detected in each channel can be sequentially changed. By arranging the detection results on the basis of the positional relationship specified by the galvanometer mirror 9 and the DMD 7, a fluorescence image with high resolution can be acquired even if the photodetector 17 has low resolution.

FIRST MODIFICATION

Figure 6:
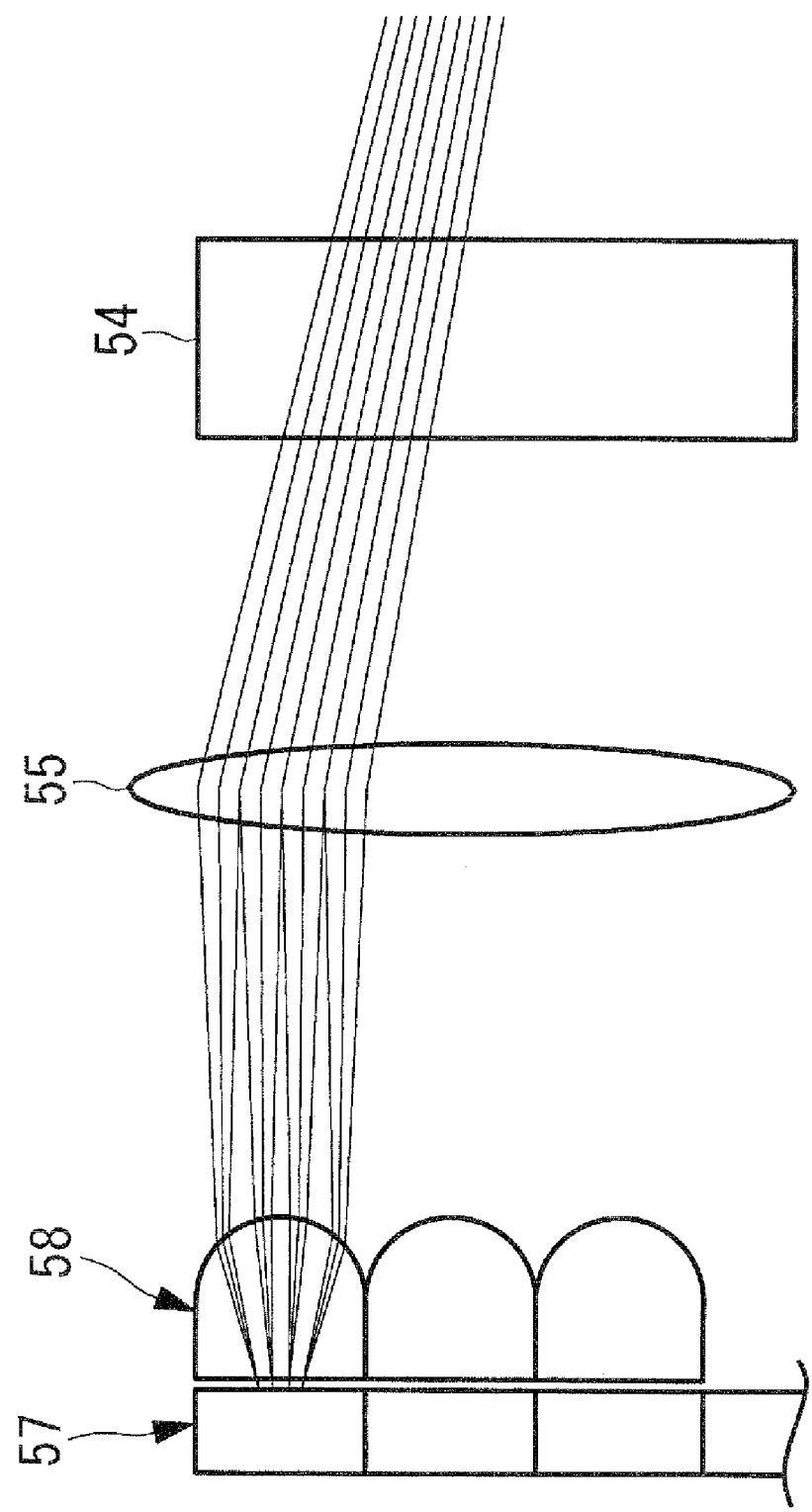
FIG. 6 is a partially enlarged view of a photodetector in a laser scanning microscope according to a first modification.

As a first modification of this embodiment, a diffraction grating (dispersing element) 54 that splits the fluorescence F from the sample 19 into spectral components may be provided between the relay lens 55 and the mirror 53, as shown in FIG. 6.

Figure 7:
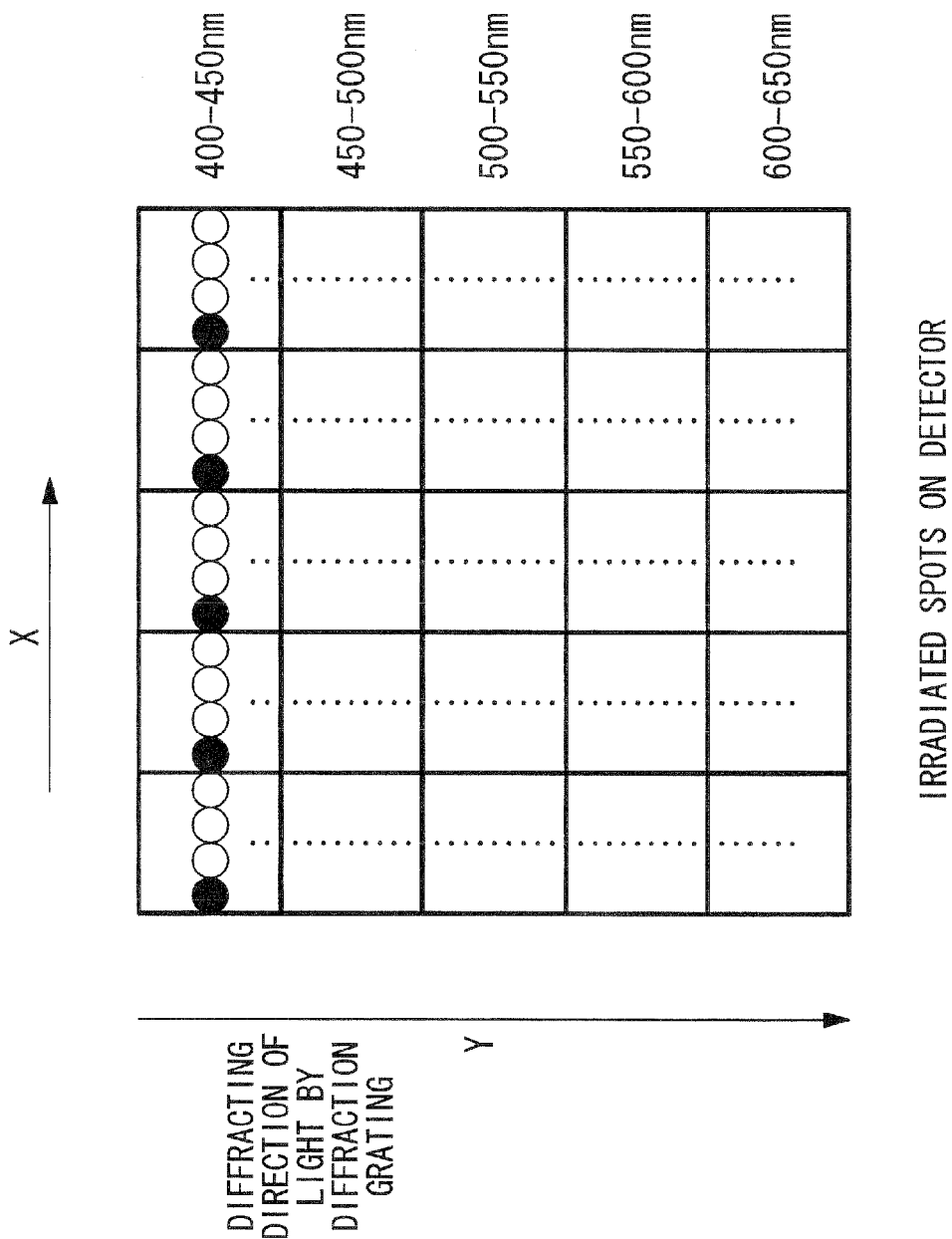
FIG. 7 is a diagram explaining the operation of the laser scanning microscope in FIG. 6.

In this modification, as shown in FIG. 7, the diffraction grating 54 is configured to split the fluorescence F from the sample 19 into spectral components in the direction (Y direction) orthogonal direction of the line before emitting them. In detail, the diffraction grating 54 is configured to split the fluorescence F from the sample 19 into, for example, a wavelength component between 400 nm and 450 nm, a wavelength component between 450 nm and 500 nm, a wavelength component between 500 nm and 550 nm, a wavelength component between 550 nm and 600 nm, and a wavelength component between 600 and 650 nm, before emitting them.

Channels of a photodetector 57 are provided in multiple arrays in the Y direction and are configured to detect the spectral components split by the diffraction grating 54.

Cylindrical lenses 58 are also provided in multiple arrays in the Y direction in correspondence to the channels of the photodetector 57.

Accordingly, the fluorescence F from different positions on the sample 19 can be split by the diffraction grating 54 so that each of the spectral components can be detected in the channels of the photodetector 57. By arranging the detection results on the basis of the positional relationship specified by the galvanometer mirror 9 and the DMD 7, a fluorescence image with high resolution can be acquired for each spectral component.

SECOND MODIFICATION

Figure 8A:
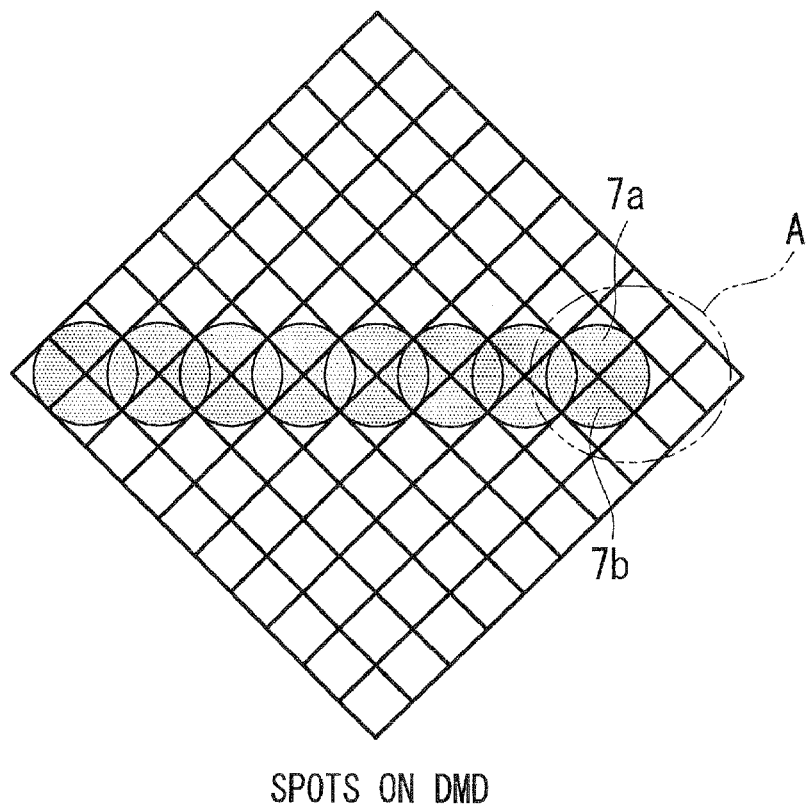
FIG. 8A is a diagram explaining the operation of a laser scanning microscope according to a second modification, showing spots on a DMD.
Figure 8B:
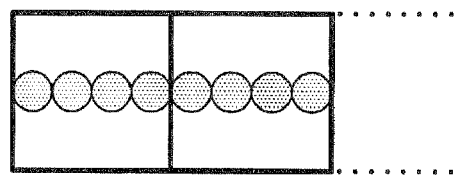
FIG. 8B is another diagram explaining the operation of the laser scanning microscope according to the second modification, showing spots on a photodetector.

As a second modification of this embodiment, the following describes a case where each focal spot is generated by using a plurality of movable micromirrors, as shown in FIGS. 8A and 8B.

Figure 9:
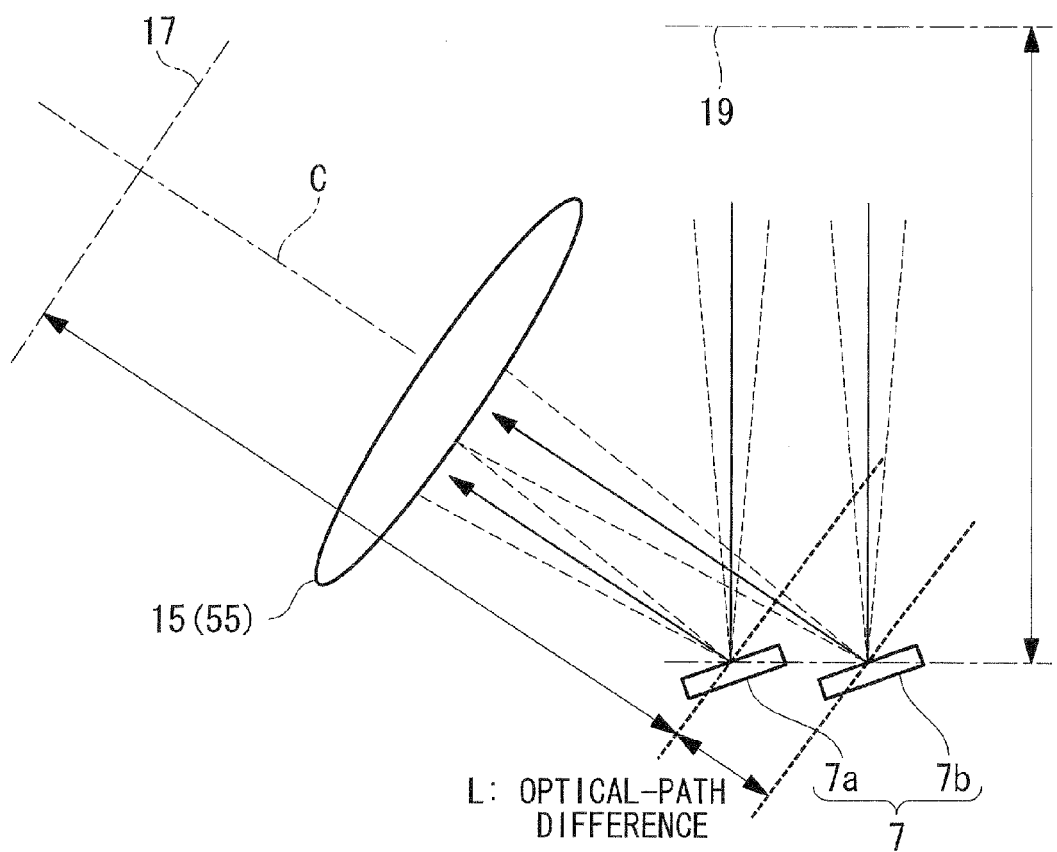
FIG. 9 is a side view showing a reflected state of fluorescence (laser light) in the DMD in FIG. 8A.

FIG. 9 is a side view showing a reflected state of the fluorescence F (laser light L) achieved by the DMD 7 in a region A in FIG. 8A. Although four movable micromirrors correspond to one focal spot in FIG. 8A, the following description is directed to an example where one focal spot is generated by using movable micromirrors 7a and 7b for the sake of simplification.

As shown in FIG. 9, when light is made incident on a reflective surface of the DMD 7 at an angle, an optical-path difference L occurs between the optical path reflected by the movable micromirror 7a and the optical path reflected by the movable micromirror 7b in the space between an observation surface of the sample 19 and a light-receiving surface of the photodetector 17.

In this case, the position (i.e., a position in the direction along an optical axis C) where light is focused by the relay lenses 15 and 55 on the photodetector 17 side differs between the optical path reflected by the movable micromirror 7a and the optical path reflected by the movable micromirror 7b. Specifically, the condition of light focused on the photodetector 17 changes depending on the pixel (movable micromirror) position of the DMD 7; for example, the spot diameter changes or the condition is affected by aberrations.

In light of this, in this modification, the depth of focus of the relay lenses 15 and 55 relative to the photodetector 17 is set greater than the aforementioned optical-path difference L.

Consequently, the light reflected by the movable micromirror 7a and the light reflected by the movable micromirror 7b can be prevented from deviating from the focused state in the photodetector 17, thereby stabilizing the image-formation state and allowing for acquisition of a clear fluorescence image.

Although this modification is described with reference to an example where one focal spot is generated using the movable micromirrors 7a and 7b, the modification can be similarly applied to a case where one focal spot is generated using three or more movable micromirrors. In that case, the depth of focus of the relay lenses 15 and 55 may be set greater than the optical-path difference from the sample 19 to the photodetector 17 with regard to the movable micromirrors that generate one focal spot.

Furthermore, a similar situation occurs when the line-focusing optical system 3 focuses the laser light from the laser light source 1 onto the DMD 7. Specifically, the condition of light focused on the DMD 7 changes depending on the pixel (movable micromirror) position of the DMD 7, resulting in an undesired change in the condition of light focused on the photodetector 17. In order to prevent this, the depth of focus of the line-focusing optical system 3 may be set greater than the optical-path difference L.

THIRD MODIFICATION

Figure 10:
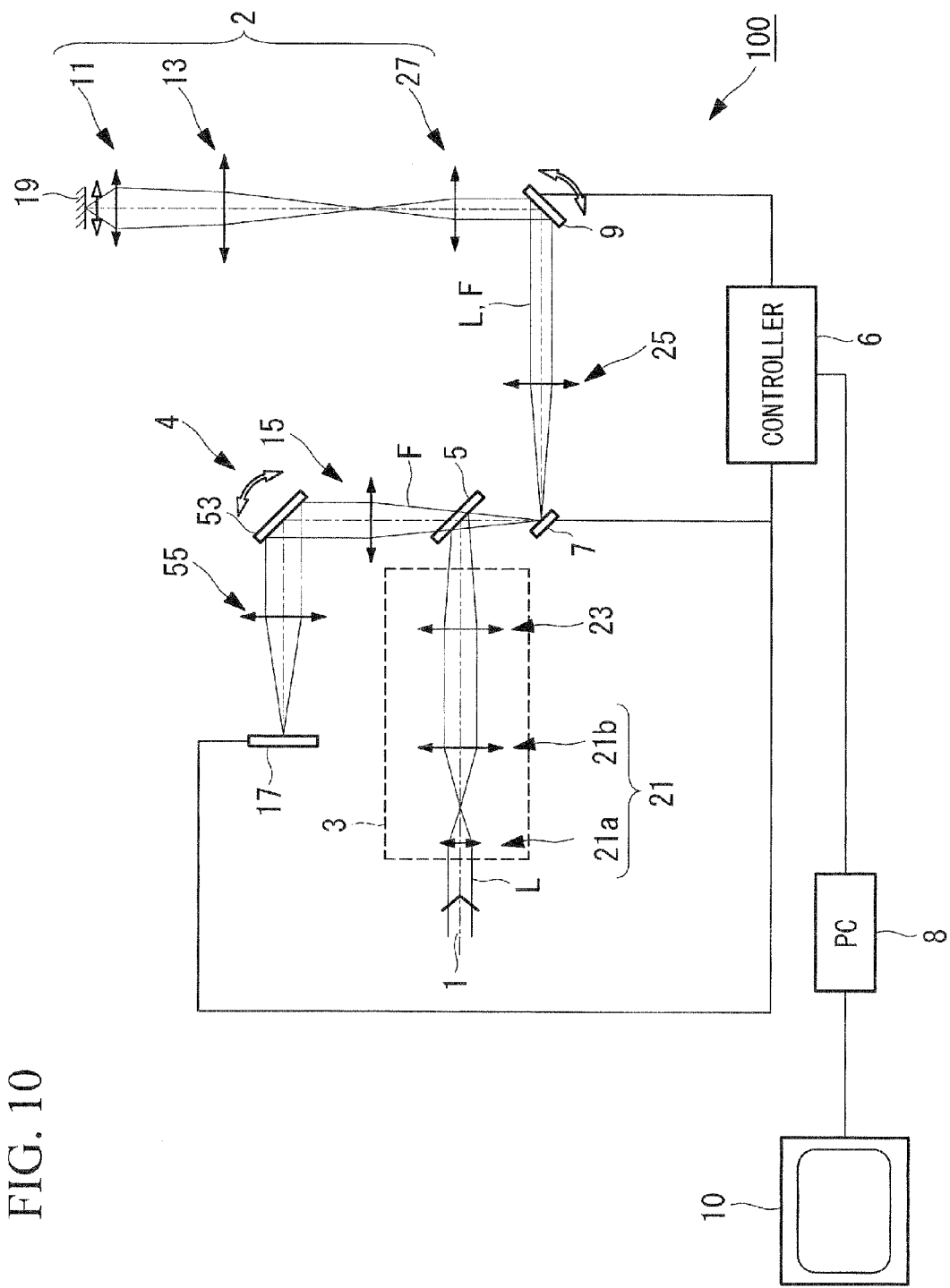
FIG. 10 is a schematic configuration diagram of a laser scanning microscope according to a third modification.

As a third modification of this embodiment, the mirror (second scanner) 53 may be of a movable type, as shown in FIG. 10, so that the fluorescence F from the sample 19 can be scanned in the direction (X direction) extending in the same direction of the line on the sample 19.

The mirror 53 scans the fluorescence F from the sample 19 in the X direction on the sample 19, that is, performs rescanning, so as to change the detection position in each channel of the photodetector 17, as shown in FIG. 11. Consequently, as shown in FIG. 11 as an example, by operating the mirror 53 so that the fluorescence F from any position on the sample 19 can be detected substantially in the center of each channel, the fluorescence F from the sample 19 can be reliably detected.

Although the embodiment of the present invention has been described above with reference to the drawings, specific configurations are not to be limited to those in this embodiment and may include design modifications within the scope of the present invention.

For example, although the laser light L is selectively reflected by the DMD 7 in this embodiment, the laser light L may be selectively transmitted.

Furthermore, although the above description is directed to an example where a DMD equipped with a plurality of movable micromirrors is used as a micro-element array, the DMD may be replaced by a liquid-crystal array equipped with a plurality of liquid-crystal elements.

Furthermore, although the above description of this embodiment is directed to a case where four spot beams of the laser light L are incident on each channel of the photodetector 17, the number of spot beams to be incident on each channel may be three or less, or five or more.

What is claimed is:

1. A laser scanning microscope comprising:
   a laser light source that emits laser light;
   a line-focusing optical system that focuses the laser light from the laser light source in the form of a line;
   a micro-element array including a plurality of micro-elements that are arrayed in the same direction of the line and reflect or transmit the laser light focused by the line-focusing optical system;
   a scanner that scans the laser light reflected or transmitted by the micro-element array in a orthogonal direction of the line;
   an irradiation optical system that irradiates a sample with the laser light scanned by the scanner;
   a photodetector disposed at a conjugate position with respect to the micro-element array and having a plurality of channels that detect light from the sample and that are arrayed in a single line at a pitch larger than that of the micro-elements of the micro-element array; and
   a controller that controls the micro-element array so as to cause the light reflected or transmitted by the different micro-elements to enter the respective channels, and that sequentially switches between the micro-elements that reflect or transmit the light that is to enter the channels so that the light from different positions on the sample enters the channels.

2. The laser scanning microscope according to claim 1, further comprising a second scanner that scans the light from the sample in a direction extending in the same direction of the line on the sample.

3. The laser scanning microscope according to claim 1, further comprising a dispersing element that splits the light from the sample into spectral components, arranges the spectral components in the direction orthogonal direction of the line, and emits the spectral components, wherein multiple arrays of the photodetectors are provided in the direction orthogonal direction of the line and detect the spectral components split by the dispersing element.

4. The laser scanning microscope according to claim 1, wherein when one focal spot is to be generated by the plurality of micro-elements, the depth of focus of at least one of the line-focusing optical system and a detection optical system that focuses light from the micro-element array onto the photodetector is set greater than an optical-path difference occurring between the micro-elements that generate the one focal spot.

* * * * *